US012790822B2

(12) United States Patent
Limozin et al.

(10) Patent No.: US 12,790,822 B2
(45) Date of Patent: Nov. 10, 2026

(54) PANEL COMPRISING TWO FACES LINKED BY A UNIFORM CONNECTING STRUCTURE

(71) Applicant: COMPAGNIE GENERALE DES ETABLISSEMENTS MICHELIN, Clermont-Ferrand (FR)

(72) Inventors: Bastien Limozin, Clermont-Ferrand (FR); Christophe Le Clerc, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 335 days.

(21) Appl. No.: 18/571,980

(22) PCT Filed: Jun. 23, 2022

(86) PCT No.: PCT/FR2022/051235

§ 371 (c)(1),
(2) Date: Dec. 19, 2023

(87) PCT Pub. No.: WO2022/269202

PCT Pub. Date: Dec. 29, 2022

(65) Prior Publication Data

US 2024/0287798 A1 Aug. 29, 2024

(30) Foreign Application Priority Data

Jun. 24, 2021 (FR) ...................................... 2106787

(51) Int. Cl.
*E04C 2/28* (2006.01)
*B32B 5/02* (2006.01)
(Continued)

(52) U.S. Cl.
CPC ................ *E04C 2/28* (2013.01); *B32B 5/024* (2013.01); *B32B 5/06* (2013.01); *B32B 5/18* (2013.01);
(Continued)

(58) Field of Classification Search
CPC ........ E04C 2/28; D03D 15/283; D03D 15/47; B32B 5/024; B32B 5/06; B32B 5/18;
(Continued)

(56) References Cited

U.S. PATENT DOCUMENTS 3,328,218 A 6/1967 Noyes
3,565,125 A 2/1971 Hayes et al.
(Continued)

FOREIGN PATENT DOCUMENTS

DE 2855194 A1 6/1980
DE 4428238 A1 2/1996
(Continued)

OTHER PUBLICATIONS

International Search Report dated Oct. 7, 2022, in corresponding PCT/FR2022/051235 (4 pages).

*Primary Examiner* — Catherine A. Simone
(74) *Attorney, Agent, or Firm* — VENABLE LLP

(57) ABSTRACT

A panel comprises a non-deformable first woven fabric and a non-deformable second woven fabric, and a linking structure comprising stays linking the first woven fabric to the second woven fabric, each stay having an at-rest length that is substantially equal to the mean of the at-rest lengths of the stays, the panel comprising a cement-based foam.

10 Claims, 2 Drawing Sheets

(51) Int. Cl.

| | |
|---|---|
| ***B32B 5/06*** | (2006.01) |
| ***B32B 5/18*** | (2006.01) |
| ***B32B 5/24*** | (2006.01) |
| ***D03D 15/283*** | (2021.01) |
| ***D03D 15/47*** | (2021.01) |

(52) U.S. Cl.

CPC ........... *B32B 5/245* (2013.01); *D03D 15/283* (2021.01); *D03D 15/47* (2021.01); *B32B 2262/0284* (2013.01); *B32B 2262/04* (2013.01); *B32B 2262/148* (2021.05); *B32B 2266/049* (2016.11); *B32B 2307/3065* (2013.01); *B32B 2307/7265* (2013.01); *B32B 2307/7375* (2023.05); *B32B 2607/00* (2013.01); *D10B 2201/24* (2013.01); *D10B 2331/04* (2013.01); *D10B 2401/04* (2013.01); *D10B 2505/00* (2013.01)

(58) Field of Classification Search

CPC .............. B32B 5/245; B32B 2266/049; B32B 2262/148; B32B 2262/04; B32B 2262/0284; B32B 2307/3065; B32B 2307/7265; B32B 2607/00; D10B 2201/24; D10B 2331/04; D10B 2401/04; D10B 2505/00

See application file for complete search history.

(56) References Cited

U.S. PATENT DOCUMENTS

| | | | |
|---|---|---|---|
| 4,304,748 | A | 12/1981 | Takahashi |
| 4,409,271 | A | 10/1983 | Pehr |
| 4,853,269 | A | 8/1989 | Fukumori et al. |
| 5,589,245 | A | 12/1996 | Roell |
| 5,595,806 | A | 1/1997 | Korfmacher |
| 6,156,406 | A | 12/2000 | Rock et al. |
| 7,913,520 | B1 | 3/2011 | Chen et al. |
| 8,783,448 | B2 | 7/2014 | Shoji et al. |
| 9,617,077 | B2 | 4/2017 | Shoji et al. |
| 11,046,112 | B2 | 6/2021 | Rigo et al. |
| 11,191,634 | B2 | 12/2021 | Spindler et al. |
| 11,325,418 | B2 | 5/2022 | Rigo et al. |
| 11,331,953 | B2 | 5/2022 | Rigo et al. |
| 11,939,708 | B2 | 3/2024 | Sun et al. |
| 12,036,829 | B2 | 7/2024 | Brousseau et al. |
| 2003/0069532 | A1 | 4/2003 | Mowry et al. |
| 2003/0106346 | A1 | 6/2003 | Matsumoto |
| 2007/0151655 | A1 | 7/2007 | Keller et al. |
| 2010/0233417 | A1 | 9/2010 | Brewin et al. |
| 2017/0044766 | A1 | 2/2017 | Hilgenbrink |
| 2019/0366772 | A1 | 12/2019 | Rigo et al. |
| 2020/0171782 | A1 | 6/2020 | Porcheret et al. |
| 2020/0254819 | A1 | 8/2020 | Cornille et al. |
| 2021/0115600 | A1 | 4/2021 | Sun et al. |
| 2022/0080775 | A1 | 3/2022 | Limozin et al. |
| 2022/0410625 | A1 | 12/2022 | Guillaumain et al. |
| 2024/0279927 | A1 | 8/2024 | Limozin et al. |
| 2024/0309564 | A1 | 9/2024 | Limozin et al. |

FOREIGN PATENT DOCUMENTS

| | | | |
|---|---|---|---|
| DE | 102018213742 | A1 | 2/2020 |
| EP | 1059159 | B1 | 5/2004 |
| EP | 2408957 | B1 | 4/2017 |
| WO | 2010/107376 | A1 | 9/2010 |
| WO | 2015/053842 | A1 | 4/2015 |
| WO | 2015/187826 | A2 | 12/2015 |
| WO | 2018/130782 | A1 | 7/2018 |
| WO | 2018/130783 | A1 | 7/2018 |
| WO | 2019/197319 | A1 | 10/2019 |
| WO | 2021/005305 | A1 | 1/2021 |
| WO | 2021/074538 | A1 | 4/2021 |

[Fig 1]
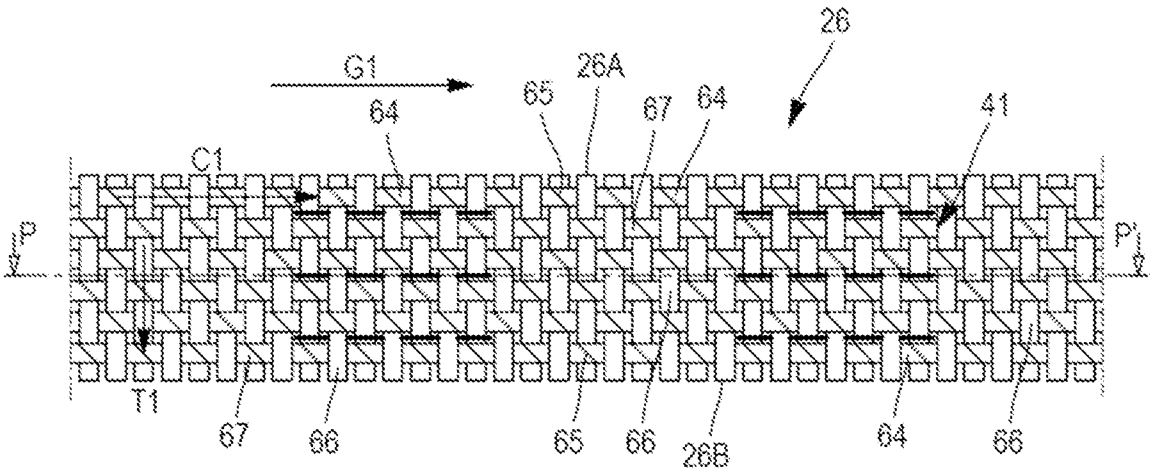

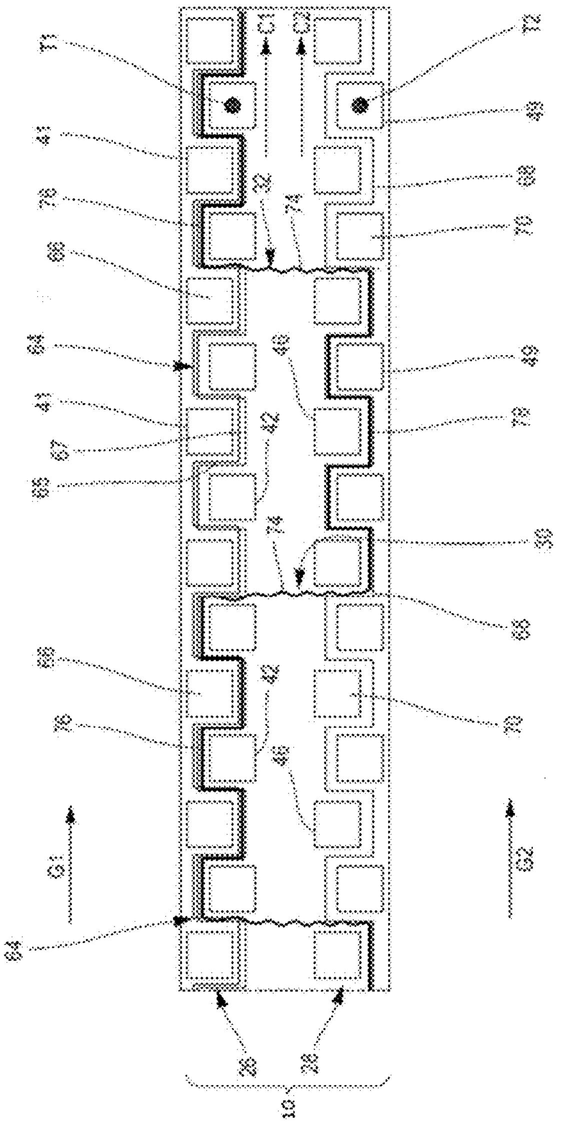
[Fig 2]

PANEL COMPRISING TWO FACES LINKED BY A UNIFORM CONNECTING STRUCTURE

TECHNICAL FIELD OF THE INVENTION

The invention relates to a panel comprising two woven fabrics linked by a load-bearing structure and to the use of such panels as building materials.

PRIOR ART

Numerous panels are used in the building industry. Included among these, mention may be made of structural panels such as concrete panels or plasterboard panels, or else insulating panels such as, for example, polyurethane, rock-wool or wood-fibre panels.

These panels may be made from a single type of material, for example plaster, and are then often qualified as “solid” panels. They may also be made of a number of distinct materials assembled with a view to improving one or more specific qualities, and are then often qualified as “composite” panels.

Document US2017/0044766 thus describes a composite floor covering made from a so-called 3-D woven fabric comprising two planar textile faces linked by spacing elements which keep the two faces parallel to and some distance apart, this 3-D woven fabric being in the form of a mesh through which cement can be poured in order to create a reinforced floor. This structure needs to be laid on a horizontal support as the panel is unable to contain the filling material.

Document WO2019/197319 describes a composite material consisting of a 3-D woven fabric comprising two faces the separation of which is regulated by spacers, and of a polyurethane foam, this material being intended to form the sole of an item of footwear, the spacers performing a mechanical-integrity function by maintaining a space between the two faces of the woven fabric, affording resistance to the successive compressions experienced by the sole.

Documents US2010/0233417 and WO2015/053842 describe a flexible textile composite able to “set” (in the way that a cement “sets”), which is to say able to become rigid or semi-rigid through the application of a liquid or of a radiation, this composite being made up of a 3-D woven fabric having two planar faces and spacers and containing a powder. The powder is incorporated via one of the faces of the woven fabric, this face being able to deform in order to create the spaces necessary for the incorporation of said powder and of contracting in order to contain the same, the face or faces of the woven fabric being moreover permeable to the liquid or radiations required for causing the powder to set in order to rigidify the composite. The faces are held some distance apart by the spacers which may individually consist of a group of fibres or of a monofilament. Although, according to US2010/0233417, there is theoretically no limit to the thickness of the composite, the constraints listed, and notably the ability of the liquid to penetrate to the core of the powdery material before the outer parts have hardened, the ability of the faces to support the weight of the powder, and the constraints regarding the rigidity of the spacers in order for them to be able to correctly perform their function of maintaining the space between the two internal faces of the composite, limit these composites to relatively small thicknesses, typically of the order of a few millimetres, as demonstrated by the “typically . . . ” examples as shown in the examples of WO2015/053842.

Document WO2015/187826 describes a textile composite comprising a nonwoven fabric of which one face is permeable to the liquid and the other face is impermeable, the fabric being filled with a material able to become rigid upon contact with the liquid. The two faces of the fabric are separated by a collection of self-supporting fibres, which is to say fibres which, overall, maintain the spacing between the two faces and are able to resist compressive mechanical forces. When this composite is curved, before the filling material hardens, wrinkles form at its surface.

The development of expanded materials such as cement-based foams cannot, however, be employed in such composites which either contain cement materials in dry and divided form or are unable to hold fluid.

Document DE 28 55 194 describes a panel able to comprise divided materials such as cement, or foams of such materials. However, the spacers of the material described in that document need to be rigid enough to maintain the separation between the two faces of the woven fabric.

SUMMARY

In order to meet these needs, the applicant company has developed a panel having a first woven fabric, a second woven fabric linked to the first woven fabric by a linking structure, filled with a filling material which is a cement-based foam.

DETAILED DESCRIPTION

Definitions

The compounds comprising carbon mentioned in the description may be of fossil or biobased origin. In the latter case, they may be partially or totally derived from biomass or may be obtained from renewable starting materials derived from biomass. Polymers, plasticizers, fillers, and the like, are notably concerned.

“Substantially parallel” or “extending substantially in”, mean that the angle formed by the two directions in question is less than 10°, preferably less than 5°, preferably less than 2° and as a very strong preference less than or equal to the error in angle measurement by a suitable method.

Two lengths are substantially equal if they are equal, to within the usual measuring tolerance for measuring such lengths or to within the tolerance of the manufacturing method using these substantially same-length elements.

A woven fabric is said to be non-deformable if the filamentary elements of which it is composed have an elongation at break that is less than 50%, preferentially less than 30%, and preferably less than 20%. The woven fabric may, however, be deformed by mechanical slipping of the filamentary elements over one another.

Woven Fabric Panel

The invention relates to a panel comprising:

- a first woven fabric comprising filamentary elements, referred to as warp elements, which are substantially parallel to one another and extend in a direction referred to as the warp direction, which constitutes a first main direction of the first woven fabric, filamentary elements, referred to as weft elements, which are substantially parallel to one another and extend in a direction referred to as the weft direction, which constitutes a second main direction of the first woven fabric, different from the first main direction of the first woven fabric;

a second woven fabric comprising filamentary elements, referred to as warp elements, which are substantially parallel to one another and extend in a direction referred to as the warp direction, which constitutes a first main direction of the second woven fabric, second filamentary elements, referred to as weft elements, which are substantially parallel to one another and extend in a direction referred to as the weft direction, which constitutes a second main direction of the second woven fabric, different from the first main direction of the second woven fabric;

a linking structure comprising n filamentary elements linking the first woven fabric to the second woven fabric, each filamentary element comprising at least one filamentary portion, referred to as a stay, extending between the first and second woven fabrics and linking the first woven fabric to the second woven fabric, each stay i having an at-rest length $h_i$ and extending from a point of attachment to the first woven fabric to a point of attachment to the second woven fabric:

characterized in that each stay of the linking structure has an at-rest length that is substantially equal to the mean $\overline{h_m}$ of the at-rest lengths of the stays, m representing the total number of stays of the linking structure, in that the first woven fabric and the second woven fabric are non-deformable and in that the panel comprises, between the internal face of the first woven fabric and the internal face of the second woven fabric, a filling material, said filling material being a cement-based foam.

What is meant by the mean of the at-rest lengths $\overline{h_m}$ of the stays is the mean of the-at-rest lengths of the stays of the linking structure, the total number of stays of the linking structure of the panel according to the invention being equal to m, which is an integer number strictly greater than 0. Thus, $$\overline{h_m} = \frac{1}{m}\sum_{i=1}^{m} h_i.$$

The total number of stays is adjusted according to the geometry of the panel, to the desired rigidity effect, and to the fluidity characteristics of the filling material. The elongation at break values of the filamentary elements are measured in accordance with the standard ASTM D885-03.

Filling Material

The panel according to the invention comprises, between the internal face of the first woven fabric and the internal face of the second woven fabric, a filling material, this material being cement-based foam.

Insulating cement-based foams or mineral foams are well known to those skilled in the art and are made from a mixture of a cement-based material and of a gas. The gas, for example air, is trapped in the cement-based material in the form of bubbles, thus forming an expanded material which offers excellent thermal and/or acoustic insulating properties and fire resistance properties with a broad range of possible densities, ranging for example from the order of 40 to more than 1000 kg/m$^3$. Such materials are commercially available, for example from the company Lafarge Holcim under the trade name "Airium" or from the company Vicat under the trade name "Aircimat".

Woven Fabrics for the Panel According to the Invention

The first woven fabric of the panel according to the invention comprises filamentary elements, referred to as warp elements, which are substantially parallel to one another and extend in a direction referred to as the warp direction, which constitutes a first main direction of the first woven fabric, filamentary elements, referred to as weft elements, which are substantially parallel to one another and extend in a direction referred to as the weft direction, which constitutes a second main direction of the first woven fabric different from the first main direction of the first woven fabric.

As a preference, the first and second woven fabrics comprise, independently of one another, a material selected from a polyester, a polyamide, a polyketone, a polyurethane, a natural fibre, an inorganic fibre and a collection of these materials, preferably selected from a polyester, a polyamide, a polyketone, a polyurethane, a natural fibre and a collection of these materials, and more preferentially selected from a polyester, a natural fibre and a collection of these materials.

In a preferred arrangement, at least one of the woven fabrics comprises a material that is fire-retardant either through its nature or by having a fire-retardant treatment.

Linking Structure

The panel according to the invention comprises a linking structure comprising filamentary elements linking the first woven fabric to the second woven fabric, each filamentary element comprising at least one filamentary portion, referred to as a stay, extending between the first and the second woven fabrics and linking the first woven fabric to the second woven fabric, each stay i having an at-rest length $h_i$ and extending from a point of attachment to the first woven fabric to a point of attachment to the second woven fabric, each stay of the linking structure having an at-rest length that is substantially equal to the mean at-rest length $\overline{h_m}$ of the stays.

What is meant by the at-rest length of a stay is the length of the stay in the longitudinal direction in the absence of any external stress loading applied to the stay (other than atmospheric pressure). A stay at rest in its longitudinal direction is neither under tension nor in compression in this direction and therefore exhibits zero elongation in this direction. Likewise, and in general, what is meant by the at-rest length of a filamentary element is the length of the filamentary element in its longitudinal direction in the absence of any external stress loading applied to the filamentary element (other than atmospheric pressure).

A filamentary element means any longilinear element of great length relative to its cross section, whatever the shape of the latter, for example circular, oblong, rectangular or square, or even flat, it being possible for this filamentary element to be twisted or wavy, for example. When its cross section is circular in shape, the diameter of this cross section is preferably less than 5 mm, more preferably comprised in a range ranging from 100 µm to 1.2 mm.

Each filamentary element of the linking structure, notably each stay that links the internal faces of the first and second woven fabrics to one another, can be characterized geometrically by its at-rest length LP and by its mean cross section SP, which is the mean of the cross sections obtained by sectioning the stay on all the surfaces parallel to the first and second woven fabrics and comprised between the first and second woven fabrics. In the most frequent case of a constant cross section of the filamentary element and of the stay, the mean cross section SP is equal to this constant cross section.

Each filamentary element of the linking structure, notably each stay, typically has a smallest characteristic dimension E of its mean cross section SP that is preferably at most equal to 0.02 times the mean at-rest length $\overline{h_m}$ of the stays and an aspect ratio R for its mean cross section SP that is preferably at most equal to 3. A smaller characteristic dimension E of the mean cross section SP of the load-bearing element at most equal to 0.02 times the mean at-rest length $\overline{h_m}$ of the stays rules out any massive load-bearing element having a large volume.

An aspect ratio R of its mean cross section SP at most equal to 3 means that the largest characteristic dimension V of its mean cross section SP is at most equal to 3 times the smallest characteristic dimension E of its mean cross section SP. By way of example, a circular mean cross section SP, having a diameter equal to d, has an aspect ratio R=1: a rectangular mean cross section SP, having a length V and a width V', has an aspect ratio R=V/V" and an elliptical mean cross section SP, having a major axis B and a minor axis B', has an aspect ratio R=B/B'.

The mean at-rest length $\overline{h_m}$ of the stays is preferably greater than 8 mm, preferably comprised between 10 and 2000 mm, preferentially comprised between 10 and 1000 mm, preferentially comprised between 10 and 500 mm, highly preferentially comprised between 30 and 100 mm, and as a very strong preference, comprised between 40 and 70 mm. This mean at-rest length may be adjusted according to the destined use of the panel according to the invention.

A stay has mechanical behaviour of the filamentary type, which is to say that it can be subjected only to tensile or compression forces along its mean line. Each stay of the linking structure is flexible. That means to say that it is able to bend without breaking and without deforming plastically. The linking structure is such that it is unable by itself to support the spacing between the two faces of the panel according to the invention. With neither filling nor internal pressure, the two faces can move closer to one another with no load being applied.

In one preferred embodiment, each filamentary element of the linking structure is a textile element. What is meant by textile is that each filamentary element of the linking structure is nonmetallic, and is, for example, made of a material selected from a polyester, a polyamide, a polyketone, a polyvinyl alcohol, a cellulose, a mineral fibre, a natural fibre, an elastomer material or a mixture of these materials. Mention may be made, among polyesters, for example, of PET (polyethylene terephthalate), PEN (polyethylene naphthalate). PBT (polybutylene terephthalate). PBN (polybutylene naphthalate). PPT (polypropylene terephthalate) or PPN (polypropylene naphthalate). Mention may be made, among polyamides, of aliphatic polyamides, such as polyamides 4-6, 6, 6-6 (nylon). 11 or 12, and aromatic polyamides, such as aramid.

For example, each filamentary element of the linking structure is a textile assembly comprising one or more monofilament or multifilament textile fibres, twisted or not twisted together. Thus, in one embodiment, it will be possible to have an assembly in which the fibres are substantially parallel to one another. In another embodiment, it will be possible to also have an assembly in which the fibres are helically wound, such as a twist or an overtwist. In yet another embodiment, each filamentary element consists of a monofilament. Each monofilament or multifilament fibre has a diameter which may range from a few hundredths of a millimetre to a few millimetres, typically comprised between 0.001 and 5 mm, preferably comprised between 5 and 50 μm, and preferentially comprised between 10 and 40 μm.

In a preferred arrangement, each filamentary element of the linking structure is a multifilament textile fibre, each fibril that makes up the textile fibre having a diameter comprised between 0.001 and 0.5 mm, preferably comprised between 5 and 50 μm, and preferentially comprised between 10 and 40 μm. Such filamentary elements have the advantage of being more flexible than monofilament filamentary elements. The woven fabric according to the invention comprising such filamentary elements can thus be stored in a very compact manner by bringing the internal faces of the first woven fabric and of the second woven fabric closer together. As a preference with this arrangement, the filamentary elements are arranged in such a way that the stays are unable by themselves to maintain the spacing between the internal faces of the two woven fabrics when the panel is subjected to a compressive loading, which is to say to a force applied to the panel perpendicular to its surface and in its direction. This arrangement is obtained by adjusting the density of the stays, expressed in terms of the number of stays per square metre, and/or by adjusting the flexibility of the stays through the thread count or the chemical nature of the filamentary elements. However, the stays do need to have enough strength to maintain the spacing between the two internal faces of the woven fabrics once the filling material has been introduced between the two internal faces of the panel according to the invention by withstanding the pressure incurred by the introduction of the filling material, which is to say by having sufficient tensile strength. This strength can be adjusted through the density of the stays and/or their tenacity and/or their chemical nature.

In another embodiment, each filamentary element of the linking structure is made of metal, for example is a metal monofilament or collection of metal monofilaments, each metal monofilament having a diameter that may range from a few hundredths of a millimetre to a few millimetres, and typically comprised between 0.01 and 5 mm. In one embodiment, each filamentary element of the linking structure consists of a collection of several metal monofilaments. In another embodiment, each filamentary element consists of a metal monofilament.

In one embodiment, each filamentary element of the linking structure extends alternately from the first woven fabric towards the second woven fabric and from the second woven fabric towards the first woven fabric, when progressing along the length of the filamentary element.

In one embodiment, each filamentary element of the linking structure comprises a first filamentary portion for anchoring each filamentary element of the linking structure in the first woven fabric, prolonging the stay into the first woven fabric.

Preferably, each first anchoring filamentary portion is interlaced with the first woven fabric. Such an assembly exhibits the advantage of being able to be manufactured in a single stage. However, it is also possible to envisage manufacturing the panel according to the invention in two stages, a first stage of manufacture of the first woven fabric and a second stage of interlacing the filamentary element or elements of the linking structure with the first woven fabric. In both cases, the interlacing of each filamentary element of the linking structure with the first woven fabric makes it possible to ensure the mechanical anchoring of each filamentary element of the linking structure in the first woven fabric and thus to confer the desired mechanical properties on the linking structure.

In one embodiment, in order to ensure the mechanical anchoring of the filamentary anchoring portion, each first filamentary anchoring portion is wound at least in part around at least one first filamentary element of the first woven fabric.

Preferably, the first woven fabric comprises:

filamentary elements, referred to as warp elements, which are substantially parallel to one another and extend in a first direction, referred to as the warp direction, substantially parallel to the first main direction of the first woven fabric, and filamentary elements, referred to as weft elements, which are substantially parallel to one another and extend in a second direction, referred to as the weft direction, intertwining with the filamentary warp elements, each first filamentary anchoring portion being wound at least in part around at least one filamentary weft element of the first woven fabric, preferably around at least two filamentary weft elements that are adjacent in the first main direction of the first woven fabric.

In one embodiment, each first filamentary anchoring portion extends in a direction substantially parallel to the first main direction of the first woven fabric.

Preferably, each first filamentary anchoring portion passes alternately from one face of the first woven fabric to the other face of the first woven fabric between two filamentary weft elements that are adjacent and around which the first filamentary anchoring portion is wound.

As a preference, at least one of the first woven fabric and second woven fabric is arranged in such a way as to be impervious to the filling material. Thus, the filling material is unable to flow through the woven fabric intended to be impervious to said material. As a preference, both of the two woven fabrics of the panel according to the invention are intended to be impervious to the filling material.

Manufacture of the Panel

In a step of forming the three-dimensional woven fabric part of the panel according to the invention, the first filamentary elements 64, 66 are assembled in such a way as to form the first woven fabric 26 and the second filamentary elements 68, 70 are assembled in such a way as to form the second woven fabric 28. The load-bearing elements, which may be coated with an adhesive composition, preferably cross-linked composition 32 are also assembled with the first and second woven fabrics 26, 28. In the embodiment described as an example, the first and second filamentary elements 64, 66, 68, 70 are assembled in a single step, and therefore simultaneously, with the load-bearing elements 32 so as to form the three-dimensional woven fabric part of the panel 24. In another embodiment, each first and second woven fabric 26, 28 is first formed separately, then the first and second woven fabrics 26, 28 are linked together using the load-bearing elements 32 which may have been coated with an adhesive composition, preferably cross-linked composition. The step of forming the woven fabric of the panel 24 according to the invention is implemented in a manner known to those skilled in the art of weft woven fabrics.

The cement-based foam is then injected via at least one end of the panel thus formed.

Thus, the invention also relates to a method for manufacturing a panel as described herein and comprising at least the following steps:

Laying down on a surface a three-dimensional woven fabric comprising:

a first woven fabric comprising filamentary elements, referred to as warp elements, which are substantially parallel to one another and extend in a direction referred to as the warp direction, which constitutes a first main direction of the first woven fabric, filamentary elements, referred to as weft elements, which are substantially parallel to one another and extend in a direction referred to as the weft direction, which constitutes a second main direction of the first woven fabric, different from the first main direction of the first woven fabric;

a second woven fabric comprising filamentary elements, referred to as warp elements, which are substantially parallel to one another and extend in a direction referred to as the warp direction, which constitutes a first main direction of the second woven fabric, second filamentary elements, referred to as weft elements, which are substantially parallel to one another and extend in a direction referred to as the weft direction, which constitutes a second main direction of the second woven fabric, different from the first main direction of the second woven fabric;

a linking structure comprising n filamentary elements linking the first woven fabric to the second woven fabric, each filamentary element comprising at least one filamentary portion, referred to as a stay, extending between the first and second woven fabrics and linking the first woven fabric to the second woven fabric, each stay i having an at-rest length $h_i$ and extending from a point of attachment to the first woven fabric to a point of attachment to the second woven fabric, each stay of the linking structure has an at-rest length that is substantially equal to the mean $\overline{h_m}$ of the at-rest lengths of the stays, and in that the first woven fabric and the second woven fabric are non-deformable;

Injecting a filling material between the internal face of the first woven fabric and the internal face of the second woven fabric, via at least one end of said panel, said filling material being a cement-based foam.

The filling material may be injected in numerous ways. For example, the cement-based foam may be injected via at least one of the ends of the three-dimensional woven fabric using one or more nozzles, the foam progressively flowing into the three-dimensional woven fabric either under the effect of gravity or "driven" by the stream of foam.

Cannulas may also be introduced into the three-dimensional woven fabric, these cannula being progressively withdrawn as foam is gradually injected into the three-dimensional woven fabric.

Assembly

The invention also relates to an assembly comprising at least one panel according to the invention. An assembly is an assembled entity that may combine any element including at least one panel according to the invention. Such an assembly may, for example, and nonlimitingly, be a built structure such as a warehouse, a building, a house, an aircraft, a ship or a land vehicle. This assembly may equally be trunking, a duct or a container.

BRIEF DESCRIPTION OF THE FIGURES

FIG. 1 View from above of the panel according to the invention.

FIG. 2 View in cross section, on the plane of cross section P-P', indicated in FIG. 1, of the panel according to the invention.

FIG. 1 depicts a view from above of a panel (10) according to the invention and FIG. 2 depicts a schematic view in cross section through a panel (10). In these two figures, the same elements are numbered in the same way.

The first woven fabric 26 comprises two longitudinal edges 26A and 26B. The first woven fabric 26 extends in a first main direction of the first woven fabric G1 substantially parallel to each longitudinal edge 26A. 26B. The first woven fabric 26 comprises filamentary elements 64, referred to as filamentary warp elements, and filamentary elements 66 referred to as filamentary weft elements. The filamentary warp elements 64 of the first woven fabric 26 are substantially parallel to one another and extend in a direction, referred to as the warp direction C1, substantially parallel to the first main direction G1. The filamentary weft elements 66 of the first woven fabric 26 are substantially parallel to one another and extend in a direction, referred to as the weft direction T1, interlacing with the filamentary warp elements 64. The filamentary warp elements 64 extend continuously along the entire length of the first woven fabric 26.

Each filamentary element 64, 66 here is, for example, a textile filamentary element.

The filamentary elements 64 are all substantially identical. Each filamentary warp element 64 comprises first and second filamentary members 65, 67. The second filamentary member 67 is substantially rectilinear and the first filamentary member 65 is wound substantially in a helix around the second filamentary member 67. Here, the first filamentary member 65 is a multifilament strand made of PET having a count equal to 110 tex and the second filamentary member 67 is a multifilament strand made of rayon with a count of 23 tex.

The filamentary elements 66 here comprise two filamentary members, the second filamentary member being substantially rectilinear and the first filamentary member being wound substantially in a helix around the second filamentary member. Here, the first filamentary member is a multifilament strand made of PET having a count equal to 110 tex and the second filamentary member is a multifilament strand made of rayon with a count of 23 tex.

The second woven fabric 28, depicted in FIG. 2, extends in a first main direction of the second woven fabric G2. The second woven fabric 28 comprises filamentary elements 68, referred to as filamentary warp elements, and filamentary elements 70 referred to as filamentary weft elements. The filamentary warp elements 68 of the second woven fabric 28 are substantially parallel to one another and extend in a direction, referred to as the warp direction C2, substantially parallel to the first main direction of the second woven fabric G2. The filamentary weft elements 70 of the second woven fabric 28 are substantially parallel to one another and extend in a direction, referred to as the weft direction T2, interlacing with the filamentary warp elements 68. The filamentary warp elements 68 extend continuously along the entire length of the second woven fabric 28.

Each filamentary element 68, 70 here is, for example, a textile filamentary element.

The filamentary elements 68 are all substantially identical and here are a multifilament strand made of PET having a count equal to 110 tex.

The filamentary elements 70 are all substantially identical and here are a multifilament strand made of PET having a count equal to 167 tex.

The panel (10) comprises a linking structure comprising filamentary elements linking the first woven fabric (26) to the second woven fabric (28), each filamentary element comprising at least one filamentary portion (74) referred to as a stay, extending between the first and second woven fabrics and linking the first woven fabric to the second woven fabric. Each filamentary element 32 extends alternately from the first woven fabric 26 towards the second woven fabric 28 and from the second woven fabric 28 towards the first woven fabric 26, when progressing along the filamentary bearing element 32. Each load-bearing filamentary element 32 here is a textile load-bearing filamentary element, made of PET and with a count of 55 tex.

Each filamentary element 32 comprises a load-bearing filamentary portion 74 extending between the first and second woven fabrics 26, 28, notably between the internal faces 42 and 46. Each filamentary bearing element 32 comprises first and second filamentary anchoring portions 76, 78 for anchoring the filamentary bearing element 32 respectively in the first woven fabric 26 and the second woven fabric 28. Each first and second filamentary anchoring portion 76, 78 prolongs the load-bearing portion 74 respectively into each first woven fabric 26 and second woven fabric 28. Each first and second filamentary anchoring portion 76, 78 is interlaced respectively with each first woven fabric 26 and second woven fabric 28. Each first and second filamentary anchoring portion 76, 78 is wound at least in part around respectively at least one first filamentary element 64, 66 of the first woven fabric 26 and at least one second filamentary element 68, 70 of the second woven fabric 28. In this way, each filamentary anchoring portion 76, 78 joins two load-bearing filamentary portions 74 together and each load-bearing filamentary portion 74 joins two filamentary anchoring portions 76, 78 together.

In this instance, each first filamentary anchoring portion 76 is wound at least in part around at least one filamentary weft element 66 of the first woven fabric 26 and, in this instance, preferably around at least two filamentary weft elements 66 that are adjacent in the first main direction of the first woven fabric G1. Similarly, each second filamentary anchoring portion 78 is wound at least in part around at least one filamentary weft element 68 of the second woven fabric 28, preferably around at least two filamentary weft elements 66 that are adjacent in the in the first main direction of the second woven fabric G2.

Each first and second filamentary anchoring portion 76, 78 extends in a direction substantially parallel respectively to the first main direction of the first and of the second woven fabric G1, G2.

Each first filamentary anchoring portion 76 passes alternately from the face 41 to the face 42 between two filamentary weft elements 66 that are adjacent and around which the first filamentary anchoring portion 76 is wound. Analogously, each second filamentary anchoring portion 78 passes alternately from the face 46 to the face 49 between two filamentary weft elements 68 that are adjacent and around which the second filamentary anchoring portion 78 is wound.

The invention claimed is:

1. A panel comprising:

a first woven fabric comprising first filamentary warp elements, which are substantially parallel to one another and extend in a first warp direction, which constitutes a first main direction of the first woven fabric, and first filamentary weft elements, which are substantially parallel to one another and extend in a first weft direction, which constitutes a second main direction of the first woven fabric, different from the first main direction of the first woven fabric;

a second woven fabric comprising second filamentary warp elements, which are substantially parallel to one another and extend in a second warp direction, which constitutes a first main direction of the second woven fabric, and second filamentary weft elements, which are substantially parallel to one another and extend in a second weft direction, which constitutes a second main direction of the second woven fabric, different from the first main direction of the second woven fabric; and a linking structure comprising filamentary elements linking the first woven fabric to the second woven fabric, each filamentary element comprising at least one stay, an amount of the at least one stay in each filamentary element ranging up to a whole number i, which is greater than or equal to 1, each stay of the at least one stay extending between the first and second woven fabrics and linking the first woven fabric to the second woven fabric, each stay of the at least one stay having an at-rest length $h_i$ and extending from a point of attachment to the first woven fabric to a point of attachment to the second woven fabric, wherein each stay of the at least one stay of the filamentary elements of the linking structure has an at-rest length that is substantially equal to a mean $\overline{h_m}$ of at-rest lengths of stays in the linking structure, m representing a total number of stays of the linking structure, wherein the first woven fabric and the second woven fabric are non-deformable, and wherein the panel further comprises, between an internal face of the first woven fabric and an internal face of the second woven fabric, a filling material, the filling material being a cement-based foam, the linking structure being unable, alone, to support a spacing between the internal face of the first woven fabric and the internal face of the second woven fabric.

2. The panel according to claim 1, wherein the first and second woven fabrics comprise, independently of one another, a material selected from the group consisting of a polyester, a polyamide, a polyketone, a polyurethane, a natural fiber, an inorganic fiber, and a combination thereof.

3. The panel according to claim 1, wherein at least one of the first woven fabric or the second woven fabric comprises a material that is fire-retardant either naturally or by undergoing a fire-retardant treatment.

4. The panel according to claim 1, wherein each filamentary element of the linking structure is a textile element.

5. The panel according to claim 4, wherein each filamentary element of the linking structure is a multifilament textile fiber, each fibril of the multifilament textile fiber having a diameter between 0.001 mm and 0.5 mm.

6. The panel according to claim 1, wherein each filamentary element of the linking structure is a metallic element.

7. The panel according to claim 1, wherein the mean $\overline{h_m}$ of the at-rest lengths of the stays in the linking structure is greater than 8 mm.

8. The panel according to claim 1, wherein at least one of the first woven fabric and the second woven fabric is arranged in such a way as to be impervious to the filling material.

9. An assembly comprising at least one panel according to claim 1.

10. A method for manufacturing the panel according to claim 1, the method comprising the following steps:

laying down on a surface a three-dimensional woven fabric comprising the first woven fabric, the second woven fabric, and the linking structure; and injecting the filling material between the internal face of the first woven fabric and the internal face of the second woven fabric, via at least one end of the panel.

* * * * *